Figure 1:
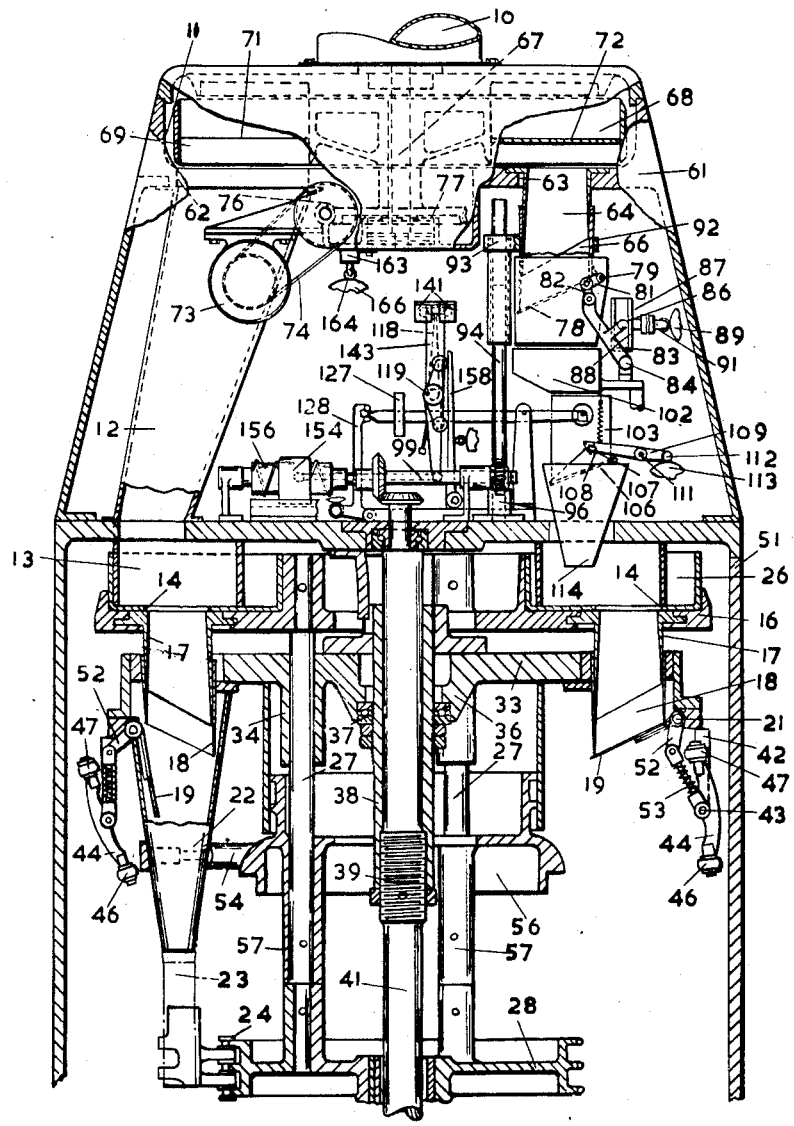

April 11, 1961 J. A. KAY ET AL 2,979,145
APPARATUS FOR THE FEEDING OF POWDER AND LIKE FLUENT MATERIALS
Filed May 20, 1955 3 Sheets-Sheet 1

Inventors
JAMES A. KAY
ALFRED G. ROSE
By
Jemmas & Jemmas
Attorneys

April 11, 1961 J. A. KAY ET AL 2,979,145
APPARATUS FOR THE FEEDING OF POWDER AND LIKE FLUENT MATERIALS
Filed May 20, 1955 3 Sheets-Sheet 2

Inventors
JAMES A. KAY
ALFRED G. ROSE
By
Semmes & Semmes
Attorneys

April 11, 1961  J. A. KAY ET AL  2,979,145
APPARATUS FOR THE FEEDING OF POWDER AND LIKE FLUENT MATERIALS
Filed May 20, 1955  3 Sheets-Sheet 3

Inventor
JAMES A. KAY
ALFRED G. ROSE
By
Semmes & Semmes
Attorneys

United States Patent Office 2,979,145
Patented Apr. 11, 1961

2,979,145

APPARATUS FOR THE FEEDING OF POWDER AND LIKE FLUENT MATERIALS

James Arthur Kay and Alfred German Rose, Gainsborough, England, assignors to Rose Brothers (Gainsborough) Limited, Gainsborough, England, a British company Filed May 20, 1955, Ser. No. 509,978

Claims priority, application Great Britain May 22, 1954

4 Claims. (Cl. 177—103)

This invention relates to apparatus for the feeding of powder and like fluent materials towards a carton or the like filling station, the apparatus being of the kind in which powder is fed from a stationary hopper or supply line into a succession of subsidiary hoppers carried by a movable member and normally closed towards their outlet ends by movable base members, each subsidiary hopper being adapted to hold a charge of powder corresponding to the amount required to be delivered to a carton, said subsidiary hoppers having a telescopic construction so that their capacity can be varied by adjustment, and in which a charge of powder is periodically fed to a weighing device to check the weight of the charges fed to the subsidiary hoppers, means responsive to the weighing action being provided for automatically adjusting the capacity of the subsidiary hoppers in accordance with any variation in weight of the charge from a pre-determined weight range.

An object of the invention is to provide an improved check-weighing mechanism in apparatus of the above kind.

According to the present invention, there is provided in an apparatus of the kind described, a movable detecting means responsive to weighing movement of the weighing device and adapted to detect variation in weight of a given charge from a pre-determined weight, means under the control of the detecting means for initiating adjusting movement of the capacity adjusting means, and a follow-up mechanism responsive to movement of the adjusting means and adapted to cause cessation of operation of the adjusting means after a period determined by the amount of movement of the detecting means.

The means for initiating the movement of the adjusting means may be in the form of a photo-electric device arranged to be activated by the detecting means and operating a motor and through suitable relay mechanism, the motor constituting the prime mover of the adjusting mechanism. The photo-electric device may be mounted on a carrier member which is conveniently movable and arranged to be moved by the follow-up mechanism in the same direction as that moved by the detecting means, such movement continuing until the photo-electric device reaches the position to which the detecting means has been moved in response to the weighing action, whereupon (the detecting means and the photo-electric device now having the same relative positions as they had before the weighing action commenced) the detecting means ceases to affect the photo-electric device and the adjusting mechanism ceases to operate.

Alternatively, the carrier member may be stationary, in which case, the follow-up mechanism will be arranged to return the detecting means to its neutral position whereupon its effect on the photo-electric device ceases and the adjusting mechanism stops as before.

The detecting means may be in the form of a screen attached to the scale pointer of a beam balance of otherwise conventional design, the screen being arranged to pass between a light source and the light-sensitive cell of a photo-electric device, the latter being activated on the interception of the light rays by the passage of the screen. For check-weighing for "light" and "heavy" charges, there will normally be provided a pair of light sensitive devices for activation by the detecting means on movement in opposite directions.

To avoid interference with the normal filling operation of the apparatus, the check-weighing charge is conveniently fed from the supply line into a check-weighing hopper of the same adjustable construction as the subsidiary hoppers and arranged for adjustment simultaneously with those hoppers, the check-weighing hopper discharging its contents into the weighing mechanism at the desired intervals, the weighing device being arranged to discharge into the main hopper feeding the subsidiary hoppers. Whatever adjustment is made to the subsidiary hoppers as a result of the check-weighing action, therefore, the same adjustment is made automatically to the check-weighing hopper so that the volume weighed is the same as that fed to the subsidiary hoppers.

While the above description has dealt specifically with using a charge of loose powder for the check-weighing operation, it will be understood that the check-weighing "charge" may be that contained in one of the filled cartons which may be removed from the machine at intervals and fed to the check-weighing device.

By way of example, the invention will now be described with reference to the accompanying diagrammatic drawings, as applied to an apparatus of the same general construction as that described in U.S. Patent No. 2,616,-652, except for the modified construction of the check-weighing and volume controlling device.

Figure 3:
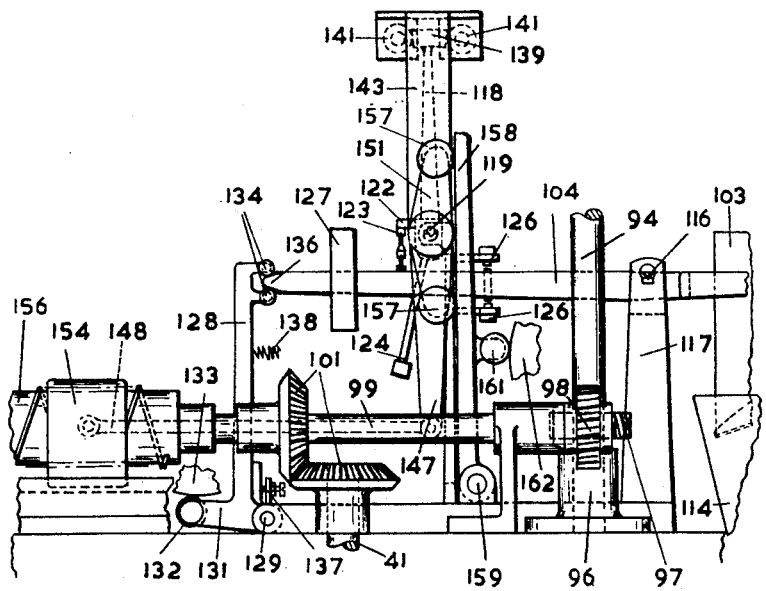
Figure 4:
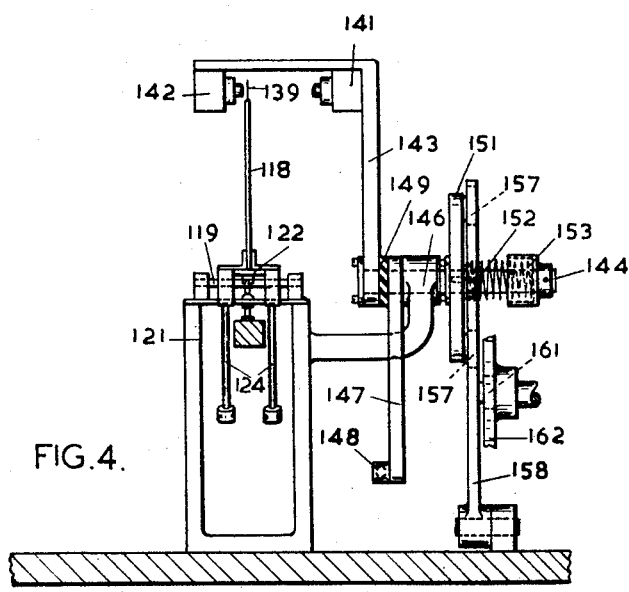
Figure 2:
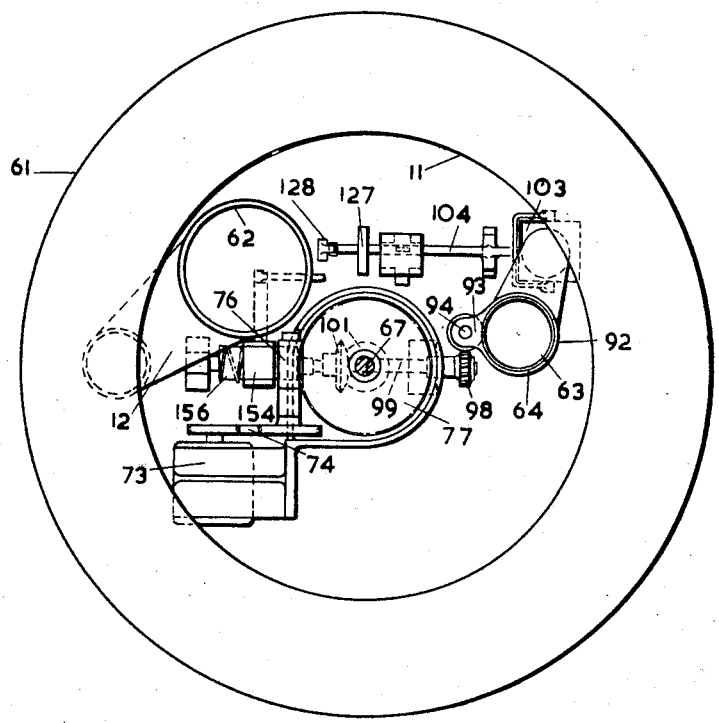

In the drawings:

Figure 1 is a sectional elevation of a powder filling apparatus constructed in accordance with the invention, Figure 2 is a plan of the apparatus with part of the upper structure removed, Figure 3 is an elevation, to a larger scale, of the check-weighing part of the apparatus, and Figure 4 is an end view, partly in section, of the apparatus shown in Figure 3.

Powder flows from a supply pipe 10 into a subsidiary chamber 11 from which it passes through a funnel 12 into a main supply chamber 13 and then through apertures 14 in a rotatable apertured wheel 16 into subsidiary hoppers 17, 18 having movable bases 19 pivoted at 21. The bases 19 are opened at intervals, as will be described, to allow the powder to fall into discharge chutes 22 leading to cartons 23 moved into position to receive the charges by a conveyor chain 24.

The chamber 13 is arranged in an annular channel 26 the walls of which extend upwardly from the wheel 16, and in the base of which are formed the apertures 14. The chamber 13 forms with the base of the channel 26 an enclosed chamber past which the hoppers 17, 18, pass in succession, the chamber 13 being of such dimensions that a number of apertures 14 have access to the chamber at the same time, filling of the hoppers 17, 18 thus taking place over the period of time required for the hopper to pass the chamber.

The wheel 16 is carried by a series of pillars 27 secured to and extending upwardly from a chain wheel 28 forming one of the supports for the conveyor chain 24, driven from a main driving shaft (not shown). The wheel 16 carries the upper portions 17 of the hoppers 17, 18, while the lower portions 18 (into which the upper portions 17 are telescoped) are carried by an adjusting wheel 33 formed with a series of depending bosses 34 by which it is slidably mounted on the series of pillars 27. The wheel 33 is formed with a central hub 36 by which it is supported on a thrust bearing 37 carried by an adjusting sleeve 38 making threaded engagement at 39 with an adjusting shaft 41 extending co-axially with the chain wheel 28 and driven by a reversible motor (not shown).

The wheel 33 carries a series of depending brackets 42 (one for each hopper 17, 18) each pivotally supporting at 43 a two-armed lever 44 the arms of which carry cam rollers 46 and 47 arranged, respectively, to engage stationary cams (not shown) mounted on the main framework 51 of the machine. The bases 19 of the hoppers 17, 18 are provided with arms 52 each of which is pivotally connected to a spring toggle member 53 carried by the lever 44. It will thus be seen that, as the rollers 46 and 47 engage the cams the bases 19 are opened or closed, as the case may be.

The chutes 22 are carried by arms 54 extending radially from a supporting ring 56 having a series of depending bosses 57 by which it is secured to the pillars 27. The chain wheel 28 thus drives the wheels 16 and 33 and the ring 56 simultaneously.

Surmounting the framework 51 is a housing 61 in which is formed the subsidiary chamber 11 mentioned above, the base of the chamber 11 having an aperture 62 for feeding the funnel 12, and a further aperture 63 in which is secured the inner member 64 of a telescopic check-weighing hopper 64, 66, the outer member 66 being slidably mounted on the member 64. Secured to a shaft 67 rotatably mounted in the housing 61 is a paddle wheel 68 having a series of radial vanes 69 forming a series of pockets 71 for transporting the powder from the supply pipe 10 to the apertures 62 and 63. One of the pockets 71 is rendered ineffective by a cover plate 72 to cut off the supply of powder to the aperture 63 at intervals to allow a complete charge to be discharged from the check-weighing hopper 64, 66.

The shaft 67 is driven from a motor 73 through a belt 74, and a worm 76 engaging a worm wheel 77 secured to the shaft 67, the speed of the motor 73 being such as to provide an adequate supply of powder to the main supply chamber 13.

The outer portion 66 of the hopper 64, 66 is provided with a base 78, hinged at 79 and provided with an arm 81 connected by a link 82 to an operating arm 83 pivoted at 84 and carrying a roller 86. A slidable bar 87 is formed with a track 88 embracing the roller 86, the bar 87 being actuated by a rotatable cam 89 engaging a roller 91 carried by the bar. The track 88 allows for the opening and closing of the base 78 in any position of adjustment of the hopper 64, 66.

Secured to the portion 66 is a flange 92 formed with a boss 93 internally threaded for the reception of a screwed shaft 94 having a lower bearing 96 in the framework 51. The shaft 94 carries a spiral gear 97 meshing with a similar gear 98 attached to a cross shaft 99 driven by bevel gearing 101 from the adjusting shaft 41.

The hopper 64, 66 is discharged at desired intervals, depending on the rate of rotation of the cam 89 through a guiding funnel 102 into the scale pan 103 of a beam balance generally referred to by reference numeral 104, the pan 103 having a spring-loaded base 106, hinged at 107 and provided with a roller 108 for engagement by an opening arm 109, pivoted at 111 and carrying a roller 112 bearing against a rotatable cam 113. After the weighing operation, the pan 103 is opened to discharge through a funnel 114 into the main supply chamber 13.

The beam 104 is pivoted at 116 in a stationary support 117 and co-operates with a detecting arm 118 pivoted at 119 on a support 121, the arm 118 being formed with a short extension 122 by which the arm is connected to the beam 104 through a pivoted link 123 having knife edge pivots, the latter being maintained in contact by a counter weight 124. Such connection between the beam 104 and the arm 118 provides for a magnification of the beam movement in the arm 118. Spring-loaded buffers 126 provide limit stops for the beam 104.

The beam 104 is provided with a weight 127 corresponding to the weight of the pan 103 and the desired charge, and to render the beam inoperative except during the check-weighing action, a beam-clamping arm 128 is pivoted at 129 and provided with an extension 131 carrying a roller 132 arranged to bear against the face of a rotatable cam 133 operating in timed relationship with the cams 89 and 113. The clamping arm 128 carries a pair of spaced rollers 134 arranged to move into engagement with the tapered end 136 of the beam 104. A stop 137 is provided to prevent undue strain on the beam pivot as the arm 128 moves into locking position under the influence of a spring 138.

The detecting arm 118 is provided with an arcuate screen 139 arranged to co-operate with a pair of spaced photo-electric devices each consisting of a light source 141 and a light-sensitive cell 142. The latter devices are mounted on a carrier 143 secured to a stub shaft 144 pivotally mounted co-axially with the arm 118 in a bearing 146 carried by the support 121, the screen 139 having a circumferential length such that, in the neutral position of the beam, the ends of the screen lie just inside the operative portions of the photo-electric devices. Pivotally mounted on the shaft 144 is a follow-up arm 147 connected to the adjusting shaft 41 through a link 148 (as will be described), the arm 147 being connected to the carrier 143 only through a friction member 149. The shaft 144 passes through the bearing 146, and there is slidably mounted on the protruding end a lever 151 (to be described). A spring 152 acts between the lever 151 and an end thrust cap 153 to urge the carrier 143 into frictional engagement with the arm 147. The link 148 connects the arm 147 to a slider 154 internally threaded for engagement with a worm 156 secured to the shaft 99 which is driven by the shaft 41 as described earlier.

The lever 151 is provided with a pair of rollers 157 arranged to be engaged by a re-setting blade 158 pivotally mounted at 159 and carrying a roller 161 arranged to engage a rotatable cam 162 operating in timed relationship with the cams 89, 113 and 133.

The light-sensitive cells 142 are connected in the circuit of the driving motor for the adjusting mechanism to control its operation, one cell causing rotation of the motor in one direction and the other cell in the opposite direction. The cells 142 are spaced from the light sources 141 in the usual manner, and the screen 139 is arranged upon movement of the beam 104 to pass between the source and the cell of one or the other device depending on the direction of movement of the screen.

When a check-weighing charge is received by the pan 103 (assuming the charge to be outside the given weight range), therefore, the screen 139 will pivot in one direction or the other according as the charge is "light" or "heavy," and light will be intercepted by the screen from one or the other of the cells 142. That cell is then activated to cause (through suitable relay mechanism) the adjusting motor to rotate in the appropriate direction to drive the adjusting shaft 41. The shaft 99 is thus rotated in the appropriate direction by the bevel gears 101 and drives the screwed shaft 94 which in turn slides the outer portion 66 of the hopper 64, 66 in the appropriate direction to adjust its capacity as a consequence of the weighing action. The hopper 64, 66, in this example, is of the same proportions as the hoppers 17, 18 described above, the latter hoppers being adjusted simultaneously at the same rate in the manner described in the patent mentioned above.

The screen 139 will, of course, move fairly quickly to its position determined by the charge (usual damping devices being provided in the balance mechanism), and immediately the adjusting operation starts, the slider 154 is moved by the worm 156 and through the link 148 causes the follow-up arm 147 to pivot and, through the friction member 149, cause the carrier 143 to move in the same direction as that just moved by the screen 139.

Such movement of the follow-up arm 147 continues until the leading cell 142 has passed the end of the screen 139, whereupon light once more passes into the cell and the driving motor is stopped.

When the weighed charge is released from the pan 103, the screen 139 will, of course, return to its neutral position, and to avoid activation of the cells 142 during such movement, means are provided for putting the cells 142 out of action except during the period of check-weighing. Such means may consist of a switch 163 having a roller 164 arranged to be engaged by a rotatable cam 166 operating in timed relationship with the cams 89, 113, 133 and 162, the switch 163 being connected in the circuit of the light sources 141. After return of the screen 139 to its neutral position, the carrier arm 143 is also returned to its central position against the action of the friction member 149 by the re-setting blade 158 moved by the cam 162 into engagement with the rollers 157 on the lever 151, the lever being pivoted until both rollers 157 are in engagement with the blade 158, such pivotal movement rotating the shaft 144 to carry the carrier 143 to its neutral position (originally determined by the setting of the blade 158 and rollers 157).

For clarity of illustration, the cams 89, 113, 133, 162 and 166 have been shown on separate shafts all stated to be driven in timed relationship. It will be understood, however, that, in practice, the cams would conveniently be counted on a common cam shaft with usual link and lever connections to the various mechanisms to be operated, the whole check-weighing and adjusting operation taking place during one revolution of the common shaft.

With the check-weighing and adjusting mechanism being independent of the rate of operation of the filling mechanism, the weighing operation may take place at any desired interval depending on the rate of rotation of the common cam shaft, thus avoiding interference with the normal operation of the filling machine.

We claim:

1. Apparatus for feeding powder in successive quantities substantially equal by volume, comprising a succession of subsidiary hoppers mounted on a movable member for movement over a closed path, a filling chamber from which said hoppers are filled by gravity during their movement over a portion of said closed path, said hoppers having a telescopic construction so that their capacity can be varied by adjustment, means for simultaneously adjusting the capacity of said hoppers, a check-weighing hopper of the same adjustable construction as the subsidiary hoppers and arranged for adjustment simultaneously therewith, the check-weighing hopper receiving its charge from a source other than said filling chamber, a weighing device including a beam balance adapted periodically to receive a given volume of powder from the check-weighing hopper and to discharge it into said filling chamber after the weighing operation, a movable detecting member operable by the beam during weighing movement thereof to detect variation in weight of the given volume from a pre-determined weight, a photo-electric device responsive to movement of the detecting member from a neutral position beyond a pre-determined initial amount, means responsive to operation of the photo-electric device for initiating operation of said adjusting means, the photo-electric device being movable in response to operation of said adjusting means in the same direction as that moved by the detecting member to render inactive the photo-electric device responsive means and thus cause cessation of operation of the adjusting means after a period determined by the amount of movement of the detecting member.

2. Apparatus for feeding powder in successive quantities substantially equal by volume, comprising a succession of subsidiary hoppers each formed in two parts telescoped into each other, the upper parts being mounted in a first rotatable wheel adapted to carry the hoppers in succession through the source of supply while the lower parts are mounted in a second wheel rotatable with the first wheel, said second wheel being adjustable axially with respect to said first wheel so as to vary the capacity of said hoppers, a filling chamber from which said hoppers are filled by gravity during a portion of a revolution of said first and second wheels, a check-weighing hopper of the same adjustable construction as the subsidiary hoppers and arranged for adjustment simultaneously therewith, the check-weighing hopper receiving its charge from a source other than said filling chamber, a weighing device including a beam balance adapted periodically to receive a given volume of powder from the check-weighing hopper and to discharge it into said filling chamber after the weighing operation, a movable detecting member operable by the beam during weighing movement thereof to detect variation in weight of the given volume from a pre-determined weight, a photo-electric device responsive to movement of the detecting member from a neutral position beyond a pre-determined initial amount, means responsive to operation of the photo-electric device for initiating operation of said adjusting means, the photo-electric device being movable in response to operation of said adjusting means in the same direction as that moved by the detecting member to render inactive the photo-electric device responsive means and thus cause cessation of operation of the adjusting means after a period determined by the amount of movement of the detecting member.

3. Apparatus for feeding powder in successive quantities substantially equal by volume, comprising a succession of subsidiary hoppers mounted on a movable member for movement over a closed path, a filling chamber from which said hoppers are filled by gravity during their movement over a portion of said closed path, said hoppers having a telescopic construction so that their capacity can be varied by adjustment, means for simultaneously adjusting the capacity of said hoppers, a check-weighing hopper of the same adjustable construction as the subsidiary hoppers and arranged for adjustment simultaneously therewith, said check-weighing hopper being mounted on a stationary part of the apparatus, a source of supply of powder for the filling chamber, the check-weighing hopper receiving its charge periodically from said source of supply, a weighing device including a beam balance adapted periodically to receive a given volume of powder from the check-weighing hopper and to discharge it into said filling chamber after the weighing operation, a movable detecting member operable by the beam during weighing movement thereof to detect variation in weight of the given volume from a pre-determined weight, means responsive to movement of the detecting member from a neutral position beyond a pre-determined initial amount for initiating operation of means controlling said adjusting means, and a follow-up device actuated by said adjusting means for rendering inactive the detecting member responsive means and thus stopping the adjusting operation after a period determined by the amount of movement of said detecting member.

4. Apparatus for feeding powder in successive quantities substantially equal by volume, comprising a succession of subsidiary hoppers mounted on a movable member for movement over a closed path, means for filling said hoppers during their movement over a portion of said closed path, said hoppers having a telescopic construction so that their capacity can be varied by adjustment, means for simultaneously adjusting the capacity of said hoppers, a check-weighing hopper of the same adjustable construction as the subsidiary hoppers and arranged for adjustment simultaneously therewith, the check-weighing hopper receiving its charge from a source other than said filling means, a weighing device including a beam balance adapted periodically to receive a given volume of powder from the check-weighing hopper and to discharge it into said filling means after the weighing operation, a movable detecting member operable by the beam during weighing movement thereof to detect variation in weight of the given volume from a pre-determined weight, a photo-electric device responsive to movement of the detecting member from a neutral position beyond a pre-determined initial amount, means responsive to operation of the photo-electric device for initiating operation of said adjusting means, the photo-electric device being movable in response to operation of said adjusting means to render inactive the photo-electric device responsive means and thus cause cessation of operation of the adjusting means after a period determined by the amount of movement of the detecting member.

References Cited in the file of this patent

UNITED STATES PATENTS

| | | |
|---|---|---|
| 2,050,496 | Mayo | Aug. 11, 1936 |
| 2,232,437 | Bushman | Feb. 18, 1941 |
| 2,597,831 | Willis | May 20, 1952 |
| 2,616,652 | Rose et al. | Nov. 4, 1952 |
| 2,678,185 | Howard | May 11, 1954 |
| 2,726,061 | Schieser | Dec. 6, 1955 |